United States Patent
Pohlan

(10) Patent No.: US 9,720,394 B2
(45) Date of Patent: Aug. 1, 2017

(54) METHOD FOR OPERATING AN AUTOMATION SYSTEM, COMPUTER PROGRAM FOR IMPLEMENTING THE METHOD AND COMPUTER SYSTEM HAVING THE COMPUTER PROGRAM

(75) Inventor: Rudolf Pohlan, Waldbronn (DE)

(73) Assignee: Siemens Aktiengesellschaft, Munich (DE)

( * ) Notice: Subject to any disclaimer, the term of this patent is extended or adjusted under 35 U.S.C. 154(b) by 1181 days.

(21) Appl. No.: 13/411,897

(22) Filed: Mar. 5, 2012

(65) Prior Publication Data
US 2012/0226377 A1  Sep. 6, 2012

(30) Foreign Application Priority Data
Mar. 3, 2011 (EP) ..................... 11156805

(51) Int. Cl.
*G05B 19/00* (2006.01)
*G05B 19/042* (2006.01)

(52) U.S. Cl.
CPC .. *G05B 19/042* (2013.01); *G05B 2219/23126* (2013.01); *G05B 2219/24085* (2013.01)

(58) Field of Classification Search
USPC .......................................................... 700/117
See application file for complete search history.

(56) References Cited

U.S. PATENT DOCUMENTS

| | | | | |
|---|---|---|---|---|
| 7,231,398 B2* | 6/2007 | Schlereth | ........... | G05B 23/0264 |
| 7,676,281 B2* | 3/2010 | Hood | ................. | G05B 19/4188 700/20 |
| 7,779,053 B2* | 8/2010 | Beck | .................. | G05B 23/0248 702/35 |
| 7,831,316 B2* | 11/2010 | Thurner | ............... | G05B 19/056 700/17 |
| 2003/0188292 A1* | 10/2003 | Herkert | ...................... | G06F 8/20 717/105 |
| 2006/0026554 A1* | 2/2006 | Daimer | ................ | G05B 19/056 717/101 |
| 2006/0212268 A1 | 9/2006 | Beck et al. | | |
| 2009/0049084 A1 | 2/2009 | Cho | | |
| 2010/0281387 A1* | 11/2010 | Holland | .................. | G05B 15/02 715/735 |
| 2010/0313074 A1* | 12/2010 | Dang Duc | ........... | G05B 19/042 714/37 |

(Continued)

FOREIGN PATENT DOCUMENTS

| CN | 1806212 | 7/2006 |
|---|---|---|
| CN | 101802803 | 8/2010 |

(Continued)

*Primary Examiner* — Christopher E Everett
(74) *Attorney, Agent, or Firm* — Cozen O'Connor

(57) ABSTRACT

A method for operating an automation system having automation units, a computer program for implementing the method and a computer system having such a computer program, wherein technology-oriented plant description data is stored in the automation system, the plant description data is organized in an object tree with nodes and edges, and wherein the plant description data comprises references to program data in individual automation programs and nodes of the object tree (36) containing references to program data are stored in or at least also in that automation unit which provides the respective program data.

10 Claims, 6 Drawing Sheets

(56) References Cited

U.S. PATENT DOCUMENTS

2012/0232876 A1* 9/2012 Misra ............... H04L 41/12
703/13

FOREIGN PATENT DOCUMENTS

| CN | 101821684 | 9/2010 |
|---|---|---|
| DE | 102 007 047 421 | 4/2009 |
| EP | 1 703 350 | 9/2006 |

* cited by examiner

METHOD FOR OPERATING AN AUTOMATION SYSTEM, COMPUTER PROGRAM FOR IMPLEMENTING THE METHOD AND COMPUTER SYSTEM HAVING THE COMPUTER PROGRAM

BACKGROUND OF THE INVENTION

1. Field of the Invention

The invention relates to system automation and, more particularly, to a method for operating an automation system having a plurality of automation units and a plurality of automation programs running on the automation units, wherein the automation system and the automation programs are intended to control and/or monitor a technical process.

2. Description of the Related Art

The term "automation unit" comprises all units, devices or systems, i.e., in addition to controllers, such as programmable logic controllers, process computers, (industrial) computers, operating and observation units (HMI units), programming units, also drive controllers or frequency converters, as are used or can be used to control, regulate and/or monitor technological processes, for example, for forming or transporting material, energy or information, in which case energy is used or converted, in particular, using suitable technical devices, such as sensors or actuators.

However, the disadvantage of conventional automation systems and means for maintaining and programming these automation systems is often that, for example, conventional operating and observation systems (HMI systems) usually have access only to a restricted range of the control and process variables handled or processed by the automation units, i.e., only the operating data relevant to the respective plant operator (i.e., operating personnel associated with the operator of the respective technical process). However, in the event of failure, lack or overloading of such automation systems, further diagnostic aids are helpful, particularly if they can be used to completely or at least virtually completely access technology-oriented plant description data.

In this case and below, those data which enable a hierarchical description of the plant and its equipment, i.e., a description of the technical process and possibly also of the automation units intended for control and/or monitoring, are interpreted as technology-oriented plant description data. The plant, i.e., the technical process, includes devices such as metering devices or transport devices, and the actuators and sensors provided in the plant, i.e., in the technical process, particularly measuring points and the process data provided by the measuring points, and additionally also sequence controllers and signal flows and process flows.

Such technology-oriented plant description data are independent of the automation units intended to control the respective technical process and are therefore nowadays also available only in engineering stations or more rarely in special maintenance and diagnostic systems.

SUMMARY OF THE INVENTION

It is an object of the invention to provide a method which provides additional data, with the result that a user of the method can quickly access the automation system or the respective technical process even without programming knowledge to thereby monitor, maintain and/or start up an automation system and/or the respective technical process.

This and other objects and advantages are achieved in accordance with the invention by providing a method in which provision is made for technology-oriented plant description data to be stored independently of the automation programs in the automation system as additional data, for the plant description data to be organized in an object tree having nodes and edges, for the plant description data to comprise references to program data in individual automation programs, and for nodes of the object tree containing references to program data to be stored in or at least also in that automation unit that provides the respective program data. In the case of more complex automation systems having a plurality of automation units, the storage of the plant description data, which is independent of the automation programs, in the automation system is effected in this case in a distributed form such that nodes of the object tree containing references to program data are stored in or at least also in that automation unit which provides the respective program data and are thus stored in different automation units in a system-based manner, i.e., the nodes are distributed.

The advantage of the invention is that, as a result of the technology-oriented plant description data being stored independently of the automation programs in the automation system, previous concepts can be maintained without change, i.e., in particular, no program changes to existing automation programs or changes to the configuration of the automation system are required, i.e., all previous automation units can continue to be used without change.

As a result of the fact that the plant description data are organized in an object tree with nodes and edges, it is possible to hierarchically structure the plant description data. Here, the actual plant description data are assigned to the nodes of the object tree, a position of the node in the object tree, specifically a position of the node in the object tree in relation to other nodes in the same object tree, coding a hierarchical and technological position of the data included in the respective node or assigned to the node. As a result of the fact that the plant description data comprise references to program data in individual automation programs, it is also possible to access the automation system via the plant description data which, on an upper hierarchical level, describe, for example, the technical process with the devices included in the plant description data, for example, metering devices and transport devices, with the result that process states, for example, are also considered as plant description data and, in the individual case, a respective current value for such a process state can be accessed. As a result of the fact that nodes of the object tree containing references to program data are stored in that automation unit which provides the respective program data, precisely those nodes of the technology-oriented object tree that correspond to the automation programs and program data stored in an automation unit based on the assignment expressed by references are stored in the automation unit. If the text here refers to storage of nodes of the technology-oriented object tree in that automation unit which provides the respective program data referred to, this means storage at least in this automation unit, i.e., the node may possibly also be stored, or may also be stored in a distributed form, such as in other automation units if program data or the like are also referred to in other automation units.

Overall, the method in accordance with the invention proposes that the automation system is accessed independently of the conventional programming view. Access becomes more easily possible for the user of the method because the plant description data provided for this purpose are organized in a technology-oriented manner. The terms technology-oriented plant description or hierarchical plant description or hierarchical object tree or technology-oriented object tree are thus synonymous designations.

Although the tree nodes of the plant description data are stored in a manner distributed among the automation units of the automation system, they form, as it were, a virtual, hierarchically organized "operating and diagnostic bus" because the individual tree nodes are networked via the edges of the object tree. As a result, starting from a node with an assignment to at least one automation unit, neighboring nodes with an assignment to possibly the same automation unit, but possibly also to other automation units, can always also be reached.

If the plant description data comprise, as references to program data in individual automation programs, either address information or symbolic identifiers used in the respective automation program, it is possible to directly or at least indirectly access the program data relating to the respective automation program. Address information makes it possible to directly designate a storage location of a data item in the automation program that is also intended to be referred to as a plant description data item, for example, an item of status information from the technical process relating for instance to whether the technical process is currently running in the automatic mode, in the manual mode or in the set-up mode, or whether the technical process is currently inactive. If the plant description data comprise symbolic identifiers used in the respective automation program, it is possible to convert such symbolic identifiers into address information in a manner known per se, such as by accessing cross-reference tables that must be held in the automation system for this purpose, optimally in that automation unit in which the referencing tree node and the automation program referred to are located.

The technology-oriented object tree usually comprises a plurality of nodes. A trivial object tree is an object tree with only one node. In the case of a plurality of nodes in the object tree, each node comprises at least one reference to a further node in the same object tree. As is conventional in tree-oriented data structures, such a reference is referred to as an edge here and below. As a result of the fact that, in one embodiment of the method, each node comprises references to adjacent nodes of the object tree, it is possible, starting from each node of the object tree, to reach all other nodes of the same object tree. Here, other nodes can be reached either directly, by virtue of the fact that the respective other node is directly connected, via an edge, to a node which is accessed first, or indirectly by virtue of the fact that the node to be reached with the node accessed first can be reached via other nodes lying between the two nodes. Therefore, any other tree node can be reached starting from any desired tree node of the hierarchical object tree.

In one embodiment of the method for an automation system having automation units which are communicatively connected in a distributed automation system via a physical bus, provision is made, starting from a first automation unit as the storage location of a referencing node, i.e., a node which is linked, via an edge starting therefrom, to a further node of the object tree, for the references to also relate to automation units connected to this first automation unit only via the bus and to nodes of the object tree there. Starting from any desired automation unit, fragments of the plant description over a plurality of involved automation units that are networked via a physical plant bus can thus be collected and recombined to form a technology-oriented plant description.

If it is ensured that all further nodes of the object tree can be reached directly or at least indirectly starting from access to any desired node of the object tree, i.e., if the data structure on which the technology-oriented object tree is based is at least a simple graph, it is possible, starting from any desired automation unit, for all fragments of the plant description over all involved automation units to be collected and to be recompiled to form a complete technology-oriented plant description. If the data structure on which the object tree is based is a complete graph, i.e., if all nodes are directly connected to one another via a respective edge, short paths in the object tree result. Depending on the complexity of the automation system, the object tree may also only partially be a complete graph, for instance, such that a complete graph is spread out between tree nodes that are stored in comparatively powerful automation units, such as programmable logic controllers, process computers or control stations, while, starting from such automation units, parts of a simple graph extend, for example, to decentralized peripherals or the like as an example of less powerful automation units.

One embodiment of the method is accordingly distinguished by the fact that a partial or complete technology-oriented plant description of the automation system, i.e., at least of the respective technical process and possibly of the respective automation solution, is automatically generated by automatically traversing the object tree starting from access to any desired node of the object tree. In the presently contemplated embodiment, a user of the method is not only able to consider or possibly change the plant data coded by the respective tree node accessed, but rather the complete object tree is automatically processed (traversing). By virtue of the fact that, starting from a node accessed first, all other nodes are visited, the technology-oriented plant description data coded there are collected and a plant description of the automation system is then automatically generated based on this data collection, not only the data of the respective tree node but also the data of all other tree nodes visited are accessed. As a result, a technological and/or hierarchical relationship is more easily revealed to the operator.

In this case, the plant description generated may be a partial plant description or a complete plant description, for instance by virtue of the fact that, in a technical process having a metering device and a transport device, only data for the metering device, for example, are compiled as a partial plant description. In the above-mentioned scenario, the plant description is a complete plant description if the collected data comprise data for the metering device and for the transport device. Here, separation and thus clarity of the data is again achieved as a result of the technology-oriented hierarchical organization by virtue of the fact that data belonging to the metering device are available only when selecting access to the metering device etc.

If the partial or complete plant description of the automation system is retrieved using an operating and observation program or is made available to the latter and individual plant description data items are accessed using the operating and observation program, a convenient and simultaneously powerful possibility for accessing the technology-oriented plant description is provided. The operating and observation program for accessing the plant description data can be based, in terms of its operation, on the standards conventional in this field of technology. As a result, a user of the method can quickly get used to the operation of this operating and observation program. Retrieving the partial or complete plant description of the automation system using such an operating and observation program means here, for example, that the operating and observation program accesses any desired first tree node of the hierarchical object tree and then reaches other tree nodes of the object tree along edges starting from this tree node and gradually along edges starting from further tree nodes to thus obtain the partial or complete plant description. An additional or alternative possibility is to provide the operating and observation program with such a plant description. Providing means here, for example, that after previous access to the object tree using an operating and observation program, the partial or complete plant description is at least temporarily held in an automation unit, in which the tree node accessed first is located, or in the operating and observation unit, for subsequent use. If it is thus determined during renewed access that, in addition to the tree node actually accessed, there is already a partial or complete plant description, the partial or complete plant description can be made available to the operating and observation program. In addition, it is likewise conceivable for the operating and observation program not to compile the partial or complete plant description but rather for the operating and observation program to call up a relevant functionality in the respective automation unit and for the automation unit then to compile the plant description using the plant description data of the tree node accessed first and further tree nodes in the same automation unit which are referenced by edges starting from the node and then, as soon as a tree node in a different automation unit is referenced via an edge, for a functionality for compiling the plant description data to also be activated in this remote automation unit or these remote automation units. As a result, the plant description is created after the called functionality has been completely executed, and only the availability of the plant description must be signaled to the operating and observation program.

The abovementioned object is thus also achieved with the above-described operating and observation program and will also be described below with further details. The abovementioned object is likewise achieved with a computer program for implementing the method and its requirements, i.e., a computer program which generates the technology-oriented object tree as the technology-oriented plant description in the automation system. With regard to this aspect, the invention is thus particularly implemented using software. The invention is thus, on the one hand, also a computer program having program code instructions which can be executed by a computer and, on the other hand, a storage medium having such a computer program and also finally an automation unit or the like, i.e., for example, a process computer with an input and output option, a programming unit or a Human Machine Interface (HMI) unit, into the memory of which such a computer program is loaded or can be loaded as a way to perform the method or its refinements.

One exemplary embodiment of the invention is explained in more detail below using the drawings. Mutually corresponding subject matters or elements are provided with the same reference symbols in all figures.

The or each exemplary embodiment should not be understood as a restriction of the invention. Rather, numerous alterations and modifications are possible within the scope of the present disclosure, in particular those variants and combinations which can be inferred by a person skilled in the art with regard to achieving the object, for example by combining or modifying individual features or elements or method steps in conjunction with the features or elements or method steps which are described in the general or specific part of the description and are contained in the claims and/or the drawing, and, through combinable features, lead to a new subject matter or to new method steps or method step sequences, and if they relate to test methods and methods of operation.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PREFERRED EMBODIMENTS

Figure 1:
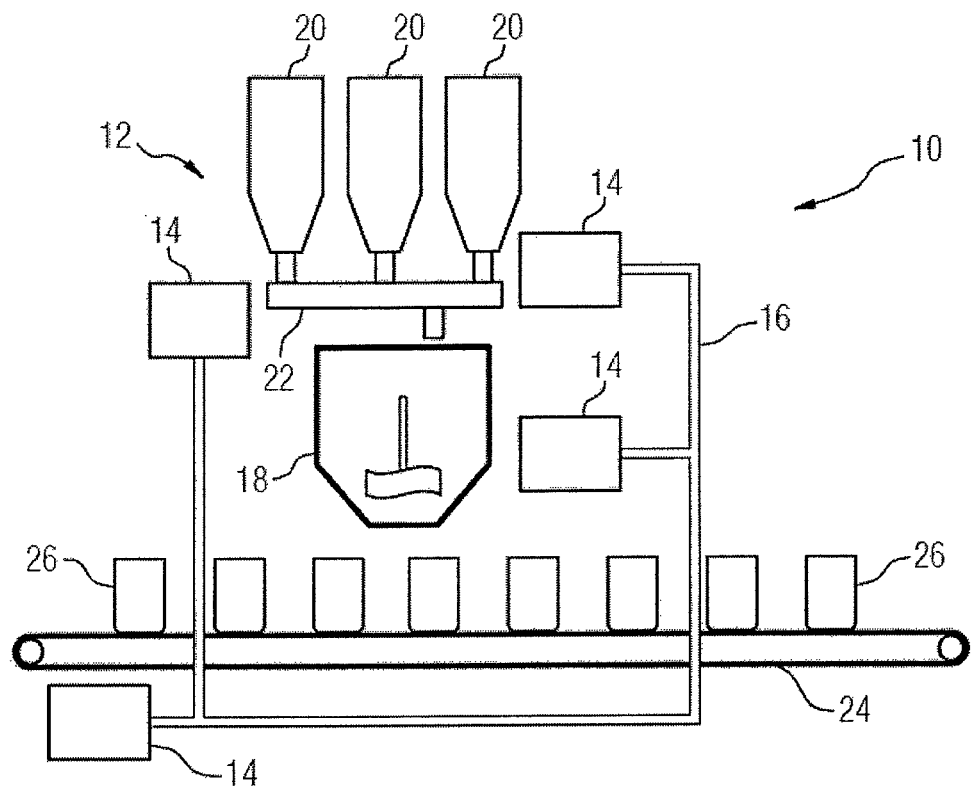
FIG. 1 shows an automation system having a plurality of automation units and a plant for a technical process.

FIG. 1 shows a conventional automation system 10 in a schematically simplified manner. This system includes a controlled and/or monitored technical process 12 as well as at least one automation unit 14 according to the definition explained at the outset, i.e., programmable logic controllers and/or decentralized peripherals, for example. A situation with four automation units 14 which are assigned to individual functional units of the technical process 12 is illustrated. For this purpose, the automation units 14 are communicatively linked in a manner known per se via a bus, such as a field bus 16.

One example of an automation unit 14 is a programmable logic controller. Essential parts of such an automation unit 14 are subassemblies for central tasks (CPU units) as well as signal, functional and communication subassemblies. The CPU unit of the programmable logic controller cyclically executes an automation program during the control mode, which program is created by a programmer using a programming unit provided with a software tool and is intended to tackle an automation task. During cyclical processing, the CPU unit first of all reads the signal states at all physical process inputs and forms a process image of the inputs. The automation program is gradually executed further taking into account internal counters, flags and times, and the CPU unit finally stores the calculated signal states in the process image of the process outputs, from which these signal states pass to the physical process outputs.

The technical process 12 comprises a metering device with a mixer 18, at least one silo 20 for raw materials to be combined in the mixer 18, a screw 22 or the like for removing the raw materials from a silo 20 and for supplying them to the mixer 18 and, in all of the abovementioned devices, the corresponding sensors and actuators for automatic control. For example, filling level sensors for each silo 20, valves at the outlet of a silo 20, an electric motor operable in one or two directions of rotation and intended to drive the screw 22, a mixer motor for driving the mixer blade, measuring sensors in the mixer 18 for acquiring data relating to the mixture in the mixer 18, valves or the like for the controlled release of the mixture from the mixer 18, or possibly heating or cooling units for the mixer 18 to bring the mixture to a predefined temperature or to keep the mixture at a desired temperature. All of these components are known per se and are not illustrated any further in FIG. 1 for reasons of clarity. It is also illustrated, for the technical process 12 shown by way of example, that the technical process 12 also includes a transport device having at least one conveyor belt 24 with which containers 26 are positioned beneath the mixer 18 and are transported away after filling. Here, the transport device comprises further units which are not illustrated, such as an electric motor for driving the conveyor belt 24, limit switches, i.e., for example, light barriers or the like, for detecting individual positions of the containers 26 during operation of the conveyor belt 24 or filling level sensors for detecting mixture which has been removed from the mixer 18 in a container 26. All of these sensors and actuators are also known per se and are accordingly not shown in FIG. 1 for reasons of clarity.

The automation units 14 are assigned to the individual parts of the technical process 12. For example, one automation unit 14 controls the mixing operation in the mixer 18 and is accordingly assigned to the mixer 18. Another automation unit 14 controls the transport device and is accordingly assigned to the conveyor belt 24. Further automation units 14 are assigned to the silos 20, for example, for recording measured values there and for controlling the removal of material from a respective silo 20, or to the screw 22 for activating the screw 22 and for controlling the direction of rotation of the screw 22.

Figure 2:
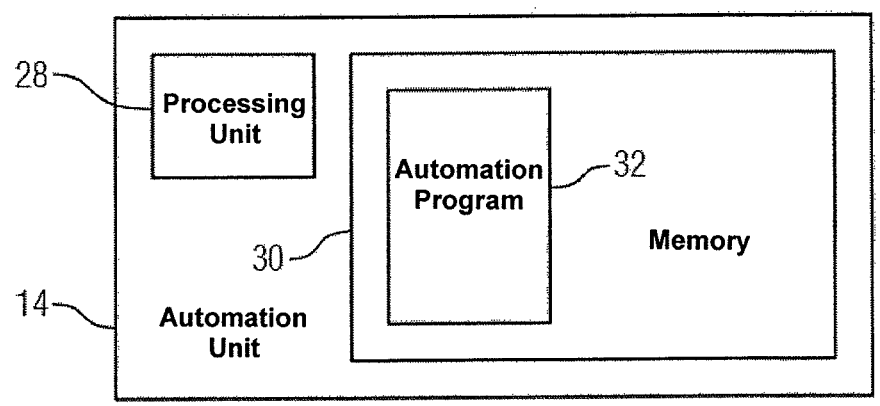
FIG. 2 shows a schematically simplified illustration of an automation unit.

FIG. 2 shows an individual automation unit 14 in a schematically simplified manner. This automation unit comprises, in a manner known per se, a processing unit comprising a microprocessor or the like and a memory 30. The memory 30 stores, likewise in a manner known per se, an automation program 32 having program code instructions for implementing the respective control and/or monitoring functionality. During operation of the automation system 10 (FIG. 1), the automation program 32 is executed by the processing unit 28 of the respective automation unit 14.

Figure 3:
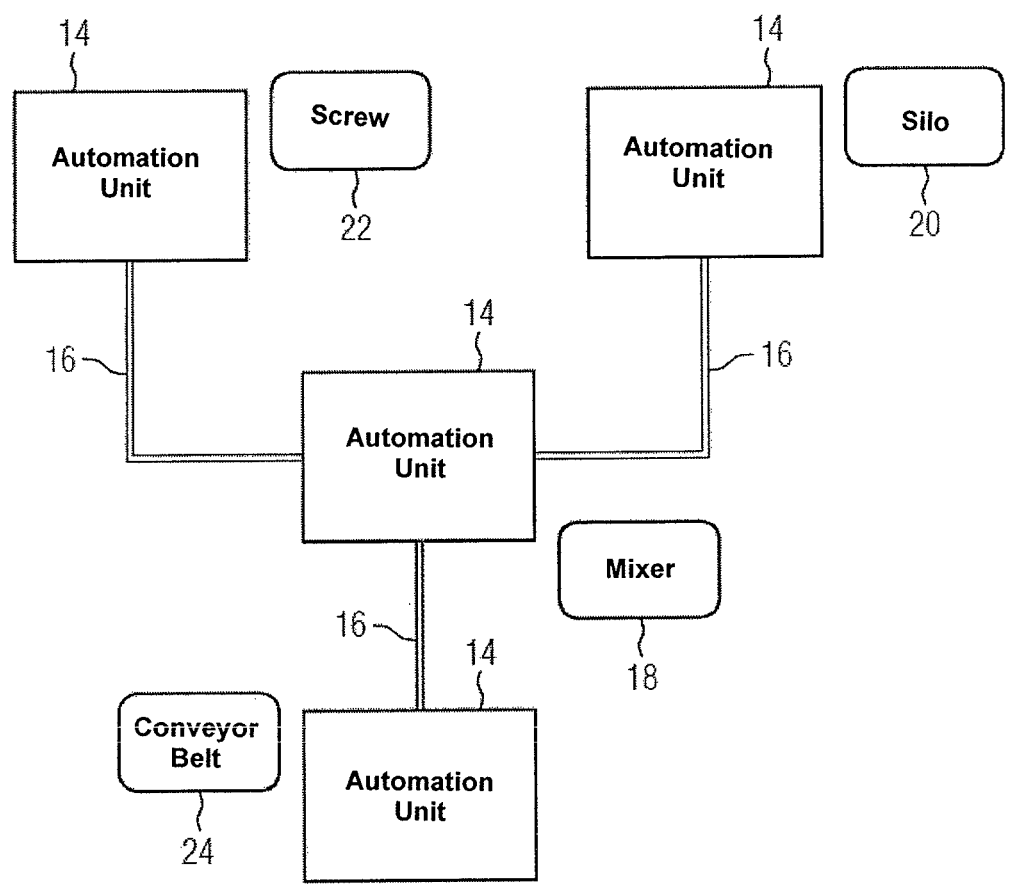
FIG. 3 shows a schematically simplified illustration of a structure of the automation units, which is hierarchical with respect to the technical process in accordance with the invention.

FIG. 3 shows another illustration of the conditions from FIG. 1 which is again schematically simplified. The automation units 14 which are communicatively connected via the bus 16 and a subprocess of the technical process 12 assigned to each automation unit 14, i.e., for example, the mixing process with the mixer 18 assigned to the automation unit 14 illustrated in the center and the subprocesses with the silos 20, the screw 22 and the conveyor belt 24 accordingly assigned to further automation units 14, are shown.

The illustration in FIG. 3 attempts to show, in particular, that there is a hierarchical order with respect to the automation system 10 (FIG. 1), especially with regard to the technical process 12 (FIG. 1). Even though the illustration in FIG. 3 is also still oriented to the exemplary technical process from FIG. 1, it should be nevertheless clear that any technical process 12 and thus any automation system 10 intended to automate the process is distinguished by such a hierarchical structure.

In known automation solutions, it is conventional practice to provide at least one automation unit 14, which at least also acts as an operating and observation unit, in the automation system 10. Special automation units 14 which act only as operating and observation units and allow an operator to intervene in the control and/or monitoring of the technical process 12 are often included in the automation system 10. Status information, for example, is presented for this purpose. Starting from the technical process 12 shown in FIG. 1, it is taken into consideration, for example, that filling level quantities of material held in the silos 20 are displayed, possibly also temperatures or other parameters relevant to the technical process 12. In addition, in the technical process 12 illustrated, it will be useful to also present status information with respect to the mixing process, i.e., a temperature of the mix, for example; a speed number of the mixer etc. is also possibly taken into consideration. Such presentations have hitherto been centrally planned when creating the automation solution and the result is an operating and observation program which runs on the respective automation unit 14 or operating and observation unit; the operating staff monitoring the technical process 12 and the automation system 10 are provided with the information required for this purpose. In addition, it may also be possible to influence the technical process 12 and/or the automation system 10, for instance in such a manner that the speed of the mixer motor can be changed via the operating and observation program by inputting a corresponding desired value, etc.

For more advanced diagnostic purposes, means which ensure a high degree of availability and simultaneously provide a technological operating model oriented to the technical equipment of the overall system are needed to rapidly and safely intervene in the plant according to the knowledge of the invention. In this case, this technology-oriented operating model is also intended to be able to be used during operation of the overall system. A solution is required, in particular, for situations in which a maintenance engineer is called to a plant and neither the maintenance engineer nor the plant operator at this moment has current technology-oriented plant description data in situ in the plant.

Figure 4:
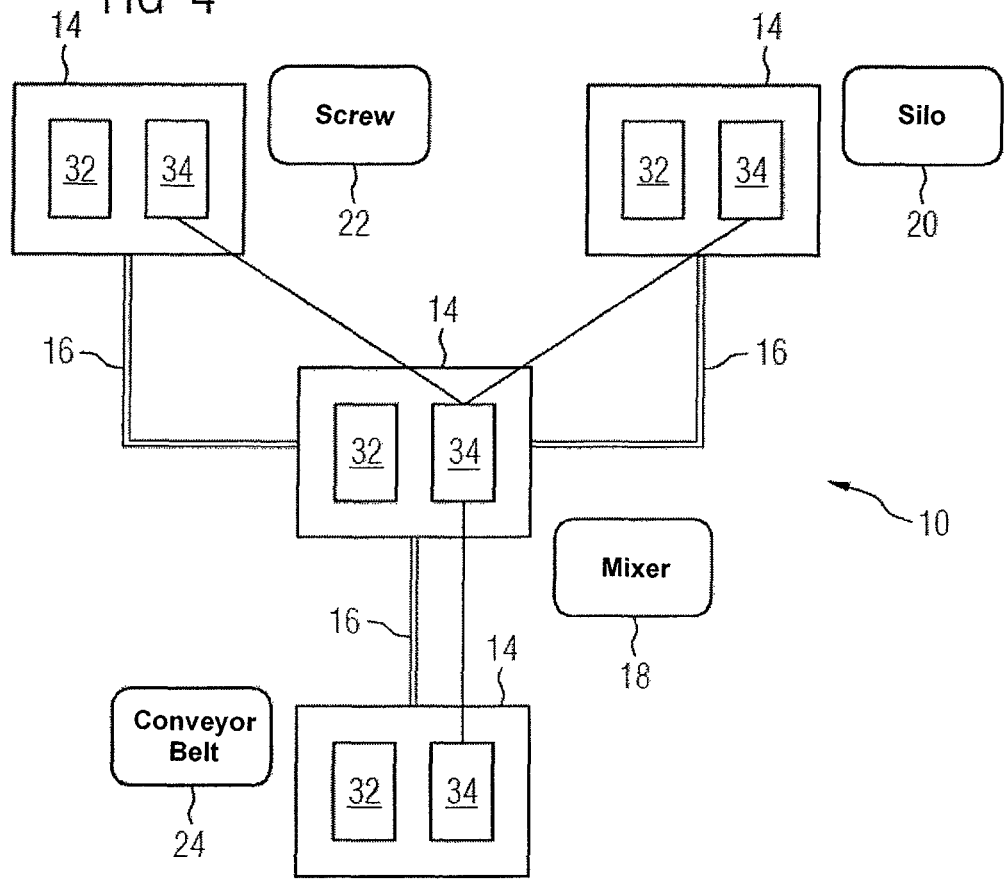
FIG. 4 shows a schematically simplified illustration of a likewise hierarchical structure of technological plant description data assigned to the individual automation units in accordance with the invention.

In this respect, FIG. 4 shows the conditions from FIG. 3 with further details. The fact that the memory 30 (FIG. 2) of each automation unit 14 has the respective automation program 32 for controlling and/or monitoring the subprocess 18, 20, 22, 24 assigned to the automation unit 14 is illustrated for each automation unit 14. Technology-oriented plant description data 34 (or "plant description data") are also held in the same memory 30. The plant description data 34 are distributed over the automation system 10, i.e., stored in a plurality of automation units 14. In this case, the plant description data 34 are linked to one another. For this purpose, provision is made for the plant description data 34 to be organized, overall, in a hierarchical structure which is referred to as an object tree 36 (FIG. 5) below.

Figure 5:
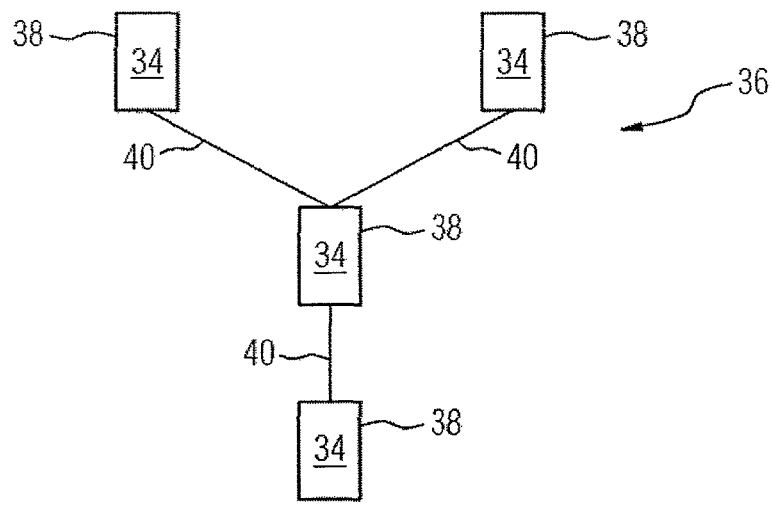
FIG. 5 shows a hierarchical object tree which results from the hierarchical structure of the plant description data and comprises the plant description data in accordance with the invention.

The object tree 36 is separately illustrated again in FIG. 5. The object tree comprises, as tree nodes 38, the plant description data 34 or at least references to such plant description data 34. There are connections between the tree nodes 38, which connections are referred to below as edges 40 according to the generally conventional terminology in graph theory. In the situation illustrated in FIGS. 4 and 5, the edges 40 each connect tree nodes 38 and the plant description data 34 directly or indirectly included in the latter beyond automation unit limits, with the inclusion of the communicative connections between the automation units 14 via the bus 16. Provision may equally be made (not illustrated) for a plurality of tree nodes 38 each with their own plant description data 34 to be instantiated in the same automation unit 14 and for connections via edges 40 to exist between at least individual tree nodes 38 instantiated in the same automation unit 14. The topology of such an object tree 36 may, in principle, extend from a trivial structure with one tree node 38 or at least two tree nodes and an edge 40 connecting these nodes to a complex structure with automation units 14 distributed in an automation system 10 and at least one tree node 38 in each automation unit 14 with connections which exist between these tree nodes 38 in the form of edges 40. In this case—and reference is made thereto only by way of example here—the situation may also exist in which a plurality of tree nodes 38 are implemented in the same automation unit 14, while there are no direct connections implemented via edges 40 between these tree nodes and such tree nodes 38 are incorporated in the object tree 36 by virtue of the fact that these tree nodes 38 are referenced by tree nodes 38 in other automation units 14. Such links are expressed by edges 40 in the object tree 36 which, in addition to the referenced tree node 38, also designate the automation unit 14 in which the referenced tree node 38 is located. Here, provision may be made for each edge 40 to designate a link target, in principle using the tree node 38 referred to and using the automation unit 14 in which said node is located. With regard to the designation of the automation unit 14, provision can then be made for a value for designating the automation unit 14, which implicitly designates the respective current automation unit 14, to be allowed in the case of an edge which does not leave the respective automation unit 14 in the object tree 36.

Figure 6:
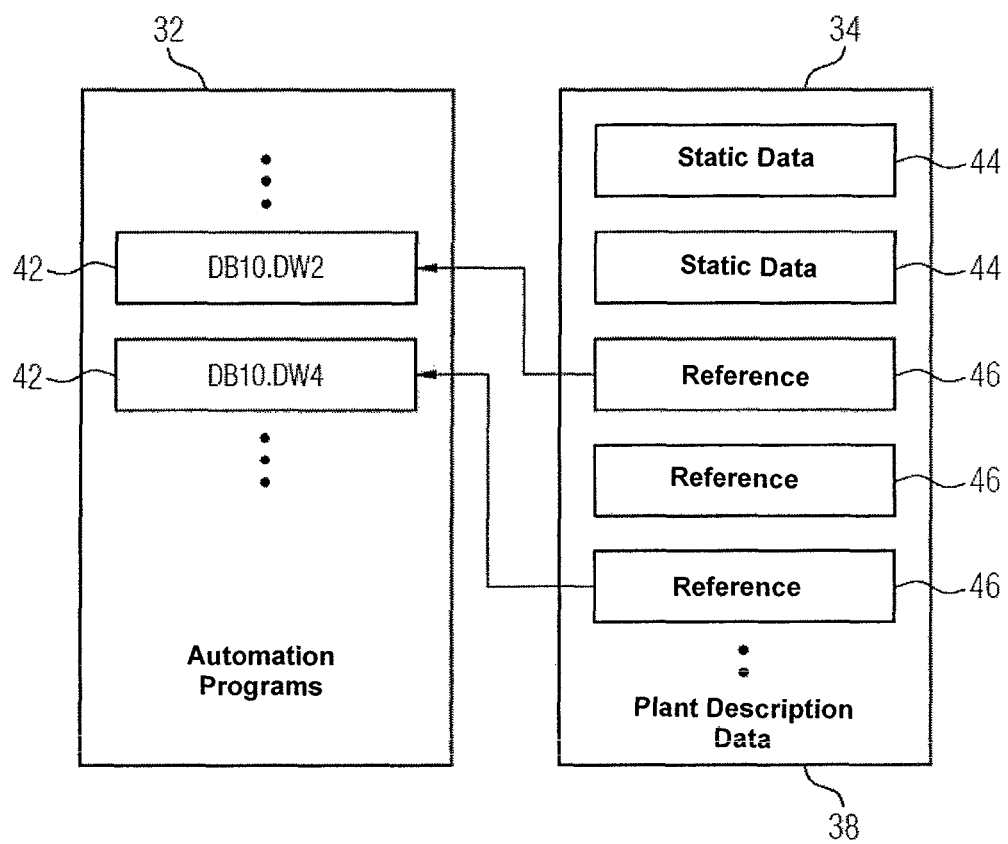
FIG. 6 shows a graphical illustration of references to program data in an automation program which is executed by an automation unit, which references are included in the plant description data.

The illustration in FIG. 4 has already shown a situation in which the technology-oriented plant description data 34 are stored independently of the automation programs 32 in the automation system 10. The plant description data 34 are also organized in the object tree 36 with nodes 38 and edges 40. It has hitherto not been illustrated that the plant description data 34 comprise references to the data handled or processed by the individual automation programs 32. This is shown in a schematically simplified manner in FIG. 6. There, the automation program 32 is illustrated on the left-hand side. This program comprises, in a manner known per se, a data part and a part containing program code instructions for handling and processing the data. The program part is not illustrated separately. For the data part, it is separately illustrated that a memory area is occupied by each data item in the memory 30 (FIG. 2) of the respective automation unit 14, with the result that the data item stored there can be handled by accessing the content of this memory area. The data words two and four (data word=DW) which are each assigned to a data block (data block=DB) with the ordinal number ten are shown as an example of two variables which can be used in an automation program 32. The text illustrated in FIG. 6 is a symbolic designation of the respective variable and of the memory address occupied by the latter. The symbolic identifiers used in the drawing are "DB10.DW2" and "DB10.DW4". These data are program data 42 according to the terminology used here and below. These program data 42 can be accessed for a technology-oriented plant description. For this purpose, provision is made for the plant description data 34 (illustrated on the right-hand side in FIG. 6) to also comprise, in addition to a plurality of static data 44 for example, references 46 to program data 42 in individual automation programs 32. Such a reference 46 means that an item of address information relating to the referenced program data 42 is contained in the plant description data 34. An alternative is to include a symbolic identifier, i.e., "DB10.DW2", for example, in the plant description data 34 as a reference 46, the memory address of the memory area created for this symbolic identifier being able to be determined using conventional means, for example, using a cross-reference table or a look-up table (LUT), all of which are not illustrated for purposes of clarity.

Serving as technology-oriented plant description data, static data 44 code, for example, is the fact that the technical process 12 comprises a mixing device or the fact that the mixing device includes a mixer 18 with a mixer blade driven by an electric motor etc.

In this respect, FIGS. 4 and 6 also show that nodes 38 of the object tree 36 containing plant description data 34 and references 46 (included in the plant description data 34) to program data 42 are stored in or at least also in that automation unit 14 which provides the respective program data 42.

Figure 7:
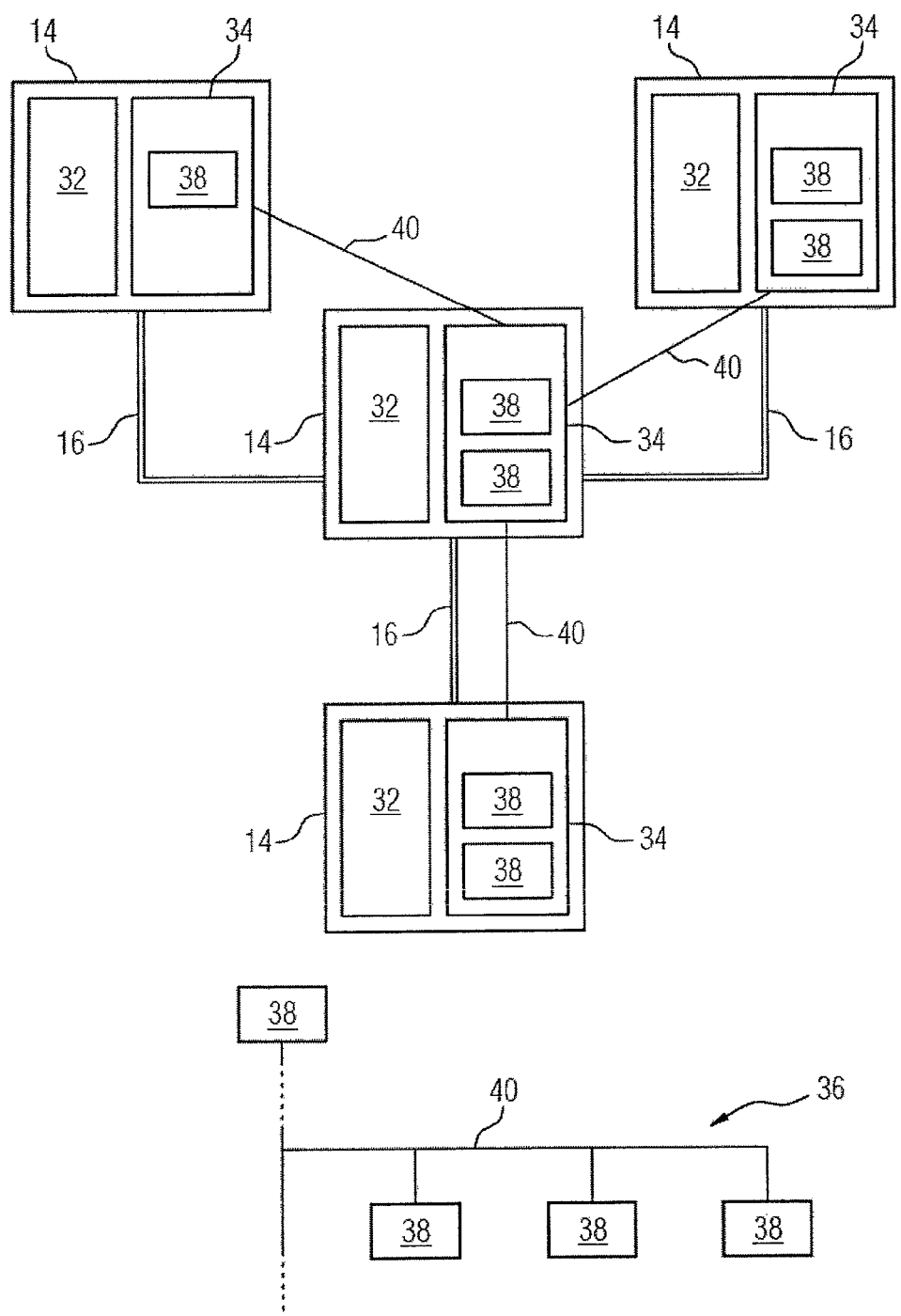
FIG. 7 shows a further illustration of the hierarchical object tree with additional details in accordance with the invention.

FIG. 7 takes up the illustration from FIG. 4 again, in which case the presentation of the elements of the technical process 12, which has already been effected only schematically in FIG. 4, is dispensed with for reasons of clarity. In this respect, reference is made to FIG. 4. FIG. 7 is intended to illustrate the variety of fundamental possibilities when organizing the object tree 36 (see, e.g., FIG. 5). Exactly like FIG. 4, FIG. 7 shows elements of the object tree 36 which are assigned to each automation unit 14 as plant description data 34. Unlike FIG. 4, however, FIG. 7 now additionally illustrates that the plant description data 34 may comprise one or more tree nodes 38 as elements of the object tree 36. Here, each tree node 38 comprises plant description data 34 of a special technological category. For example, in the technical process 12 illustrated in FIG. 1, at least the subprocess with the mixer 18, then the subprocess with the screw 22 and finally the subprocess with the conveyor belt 24 have an electric motor. An electric motor is a technological object which is normally taken into account in a technology-oriented plant description. In order to describe such an object, different data are taken into consideration, for example, static data 44, such as position, type or power. In addition, dynamic data are also taken into consideration, for example, an item of status information relating to whether the motor is running or is currently switched off. An item of status information with regard to a current speed or static or variable information with respect to limit values for such a speed are possibly also additionally taken into consideration.

Based on this example which can, in principle, be applied to any other technological object or groups of technological objects, it becomes easily conceivable for each automation unit 14 which controls an electric motor, for example, with its automation program 32 to store a tree node 38 containing plant description data 34 for such electric motor. The plant description data 34 of such tree nodes 38 allow, with respect to their dynamic parts, access to program data 42 in the respective automation program via a reference 46 (FIG. 6).

A suitable technological grouping is then produced in the resultant object tree 36—and this is shown by the lower section of the illustration in FIG. 7—by virtue of the edges 40 connecting individual tree nodes 38. As a result, for example, the three tree nodes 38 according to the selected example which are intended to represent the electric motors of the technical process 12 are arranged on a common hierarchical level in the object tree, with the result that, when accessing the object tree 36 in the sense of a technology-oriented plant description, a simultaneous display, or at least a display indicated as being connected, of all electric motors and the data assigned to the latter is possible. This example can be applied to all other technological objects of the illustrated process 12, for example, valves or groups of valves which, in the illustrated example, can be assumed to be necessary at least on the silos 20 and on the mixer 18. Further examples are limit switches or limit value detectors, one or more filling level monitors being considered, at least in the case of the silos 20 and the mixer 18, in order to be able to monitor and report a condition, such as a minimum and/or a maximum filling level.

The structuring of the plant description data 34 is defined, in principle, by a planner when creating the automation solution for the automation system 10 and the respective technical process 12. This also defines the type and granularity of the plant description data 34 and of the tree nodes 38 required for this purpose. As soon as the necessary tree nodes 38 have been defined, the connection required between them can be planned by providing edges 40 between the individual tree nodes 38 in the object tree 36 for this purpose.

Such a technology-oriented description makes it possible for the user, when accessing at least one of the automation units 14, to also gain access to the plant description data 34 stored there as part of the object tree 36. Access to the plant description data 34 immediately enables technology-oriented access to the functionalities controlled and/or monitored by this automation unit 14 because, if the respective automation unit 14 drives an electric motor, for example, a tree node 38 of the object tree 36 comprising plant description data 34 will usually be provided for this electric motor according to the planning mentioned above. As a result of the fact that at least one edge 40 will lead to a further tree node 38 from the tree node 38 in the case of a non-trivial object tree 36, it is possible to completely or partially traverse the object tree 36. As a result, starting from a tree node 38 accessed first, it is also possible to access further tree nodes 38 connected to the node via at least one edge 40. Such access to a plurality of tree nodes 38 allows an additional overview of the technical process 12 from the point of view of the plant description. In addition, if the first access to a tree node 38 has referred, for example, to one of the electric motors included in the technical process 12, it becomes possible to access all plant description data 34 relating to electric motors by accessing further tree nodes 38 directly or indirectly connected to this first tree node 38. This traversing of the object tree 36 can be continued until all tree nodes 38 of the object tree 36 have finally been reached, with the result that, starting from access to a tree node 38 in any desired automation unit 14, i.e., at any desired location in the automation system 10 or at any desired location in the object tree 36, it is possible to access a complete plant description, the structure of the plant description according to the object tree 36 being retained. Consequently, a technology-oriented plant description is available to the user of the method as a result.

The user can therefore, for example, switch off all electric motors or all electrical drive units in their entirety or can close all valves. Another application scenario involves displaying the status of all limit value detectors. As a result, if the automation unit 14 controlling the mixer 18 is accessed via the technology-oriented plant description, for example, it is readily also possible to access status information relating to limit value monitors that are assigned to the silos 20. In contrast to this, conventional operating and observation units have restrictions because they are not necessarily complete with regard to the static plant description data and the signal flows, the image hierarchy does not necessarily correspond to the plant hierarchy and, in particular, the units are not available in situ in the plant because they are remote in an operating station or the like. The filling level measured values of the silos 20 would then be accordingly displayed by an operating and observation unit assigned to the automation unit 14 that controls the silos 20. However, these two automation units 14 assumed to be exemplary here need not be situated at the same location in a technical process of the type illustrated in FIG. 1. As a result, it is not readily clear, when viewing the display of the mixing process, whether there is possibly an exceptional situation with regard to the filling level monitoring of the silos 20. In contrast, access to the technology-oriented plant description data enables the simultaneous or at least connected presentation of all such data because filling level monitors are assumed to be connected from a technology-oriented point of view.

Figure 8:
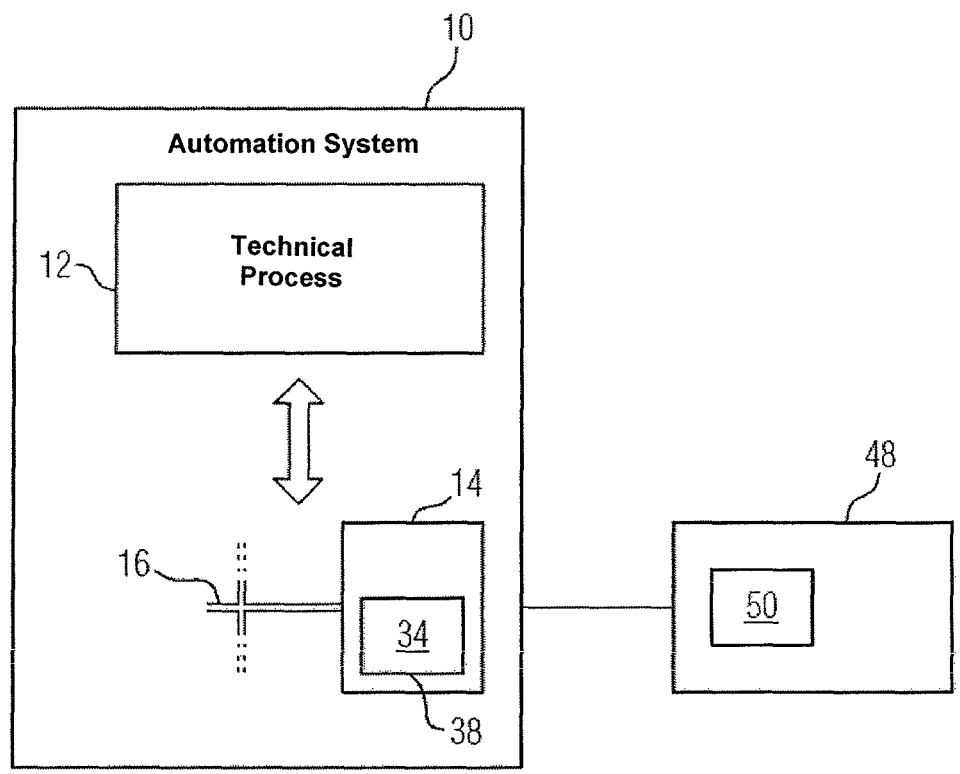
FIG. 8 shows a schematically simplified illustration of an operating and observation unit having an operating and observation program as an example of a computer program for accessing the hierarchically structured, technological plant description data.

In this respect, FIG. 8 finally shows a special automation unit connected to one of the automation units 14 of the automation system 10, i.e., an operating and observation unit 48 which is used to access plant description data 34 held in this automation unit 14 and thus at least one tree node 38 of the object tree 36 of the technology-oriented plant description. A partial or complete plant description of the automation system 10 can be retrieved using an operating and observation program 50 running on the operating and observation unit 48 or can be made available thereto by completely or partially traversing the object tree 36, individual plant description data being accessed using the operating and observation program 50 by traversing the object tree 36 or a local copy of the object tree 36 that is loaded into the memory of the operating and observation unit 48. The operating and observation program 50 is an example of a computer program having program code means for performing the method steps required in connection with access to the plant description data 34. Here, the operating and observation program 50 is, in principle, also intended to perform all the method steps which are described here and relate to special refinements of the access to the plant description data 34.

A computer program, with which the plant description data 34 and the object tree 36 with its tree nodes 38 and edges 40 running between the latter are planned and implemented in a distributed manner in the individual automation units 14, is not separately illustrated. Such a computer program may be provided as a subfunctionality of an engineering system and is accordingly executed on a programming unit which is used to create an automation solution for a specific technical process 12 and an automation task resulting therefrom.

Individual aspects of the description presented here which are in the foreground can thus be briefly summarized as follows: the invention relates to a method for operating an automation system 10 having automation units 14, to a computer program for implementing the method and to a computer system having such a computer program, technology-oriented plant description data 34 being stored in the automation system 10, in particular being stored in a distributed manner, the plant description data 34 being organized in an object tree 36 with nodes 38 and edges 40, the plant description data 34 comprising references 46 to program data 42 in individual automation programs 32, and nodes 38 of the object tree 36 containing references 46 to program data 32 being stored in or at least also in that automation unit 14 which provides the respective program data 42.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for operating an automation system having a plurality of automation units and a plurality of automation programs which run on each of the plurality of automation units to at least one of control and monitor a technical process, the method comprising:
    storing technology-oriented plant description data independently of the plurality of automation programs in the automation system;
    organizing the plant description data in an object tree with nodes and edges, the plant description data comprising references to respective program data relating to each automation programs of the plurality of automation programs;
    storing the nodes of the object tree containing the references to the respective program data at least in memory of the automation unit of the plurality of automation units which provides the respective program data, a memory area of the memory for storing the nodes of the object tree containing the references being determined based on a cross-reference table or a look-up table; and
    executing each of the plurality of automation programs on the respective automation units of the plurality of automation units to control the technical process such that an automation solution for the technical process and a resultant automation solution is created.

2. The method as claimed in claim 1, wherein the plant description data comprises, as the references to the respective program data relating to each automation program of the plurality of automation programs, address information or symbolic identifiers used in the respective automation program.

3. The method as claimed in claim 2, wherein each node of the object tree contains plant description data comprising references to adjacent nodes of the object tree, the references to adjacent nodes representing edges in the object tree.

4. The method as claimed in claim 1, wherein each node of the object tree contains plant description data comprising references to adjacent nodes of the object tree, the references to adjacent nodes representing edges in the object tree.

5. The method as claimed in claim 4,
    wherein the plurality of automation units are communicatively connected via a physical bus; and
    wherein, starting from a first automation unit of the plurality of automation units as a storage location of a respective referencing node, the references to the respective program data also relate to automation units connected to the first automation unit only via the physical bus and to nodes of the object tree at the first automation unit.

6. The method as claimed in claim 5, wherein all further nodes of the object tree are reachable directly or at least indirectly starting from access to any desired node of the object tree.

7. The method as claimed in claim 6, further comprising: traversing, starting from access to any desired node of the object tree, the object tree to generate a partial or complete plant description of the automation system.

8. The method as claimed in claim 7, further comprising:
    retrieving the partial or complete plant description of the automation system via an operating and observation program or providing the partial or complete plant description of the automation system to the operating and observation program; and
    traversing the object tree to access individual plant description data items are via the operating and observation program.

9. A non-transitory data storage medium encoded with a computer program executing on a processor which, when used on a computer, causes the processor to operate an automation system having a plurality of automation units and a plurality of automation programs which run on each of the plurality of automation units to at least one of control and monitor a technical process, the computer program comprising:
    program code for storing technology-oriented plant description data independently of the plurality of automation programs in the automation system;
    program code for organizing the plant description data in an object tree with nodes and edges, the plant description data comprising references to respective program data relating to each automation programs of the plurality of automation programs;
    program code for storing the nodes of the object tree containing the references to the respective program data at least in memory of the automation unit of the plurality of automation units which provides the respective program data, a memory area of the memory for storing the nodes of the object tree containing the references being determined based on a cross-reference table or a look-up table; and
    program code for executing each of the plurality of automation programs on the respective automation units of the plurality of automation units to control the technical process such that an automation solution for the technical process and a resultant automation solution is created.

10. A computer system encoded with a computer program stored on a non-transitory storage medium and executing on a processor which, when loaded on the computer system, causes the processor to operate an automation system having a plurality of automation units and a plurality of automation programs which run on each of the plurality of automation units to at least one of control and monitor a technical process, the computer program comprising:
- program code for storing technology-oriented plant description data independently of the plurality of automation programs in the automation system;
- program code for organizing the plant description data in an object tree with nodes and edges, the plant description data comprising references to respective program data relating to each automation programs of the plurality of automation programs;
- program code for storing the nodes of the object tree containing the references to the respective program data at least in memory of the automation unit of the plurality of automation units which provides the respective program data, a memory area of the memory for storing the nodes of the object tree containing the references being determined based on a cross-reference table or a look-up table, and
- program code for executing each of the plurality of automation programs on the respective automation units of the plurality of automation units to control the technical process such that an automation solution for the technical process and a resultant automation solution is created.

* * * * *